Patented June 11, 1935

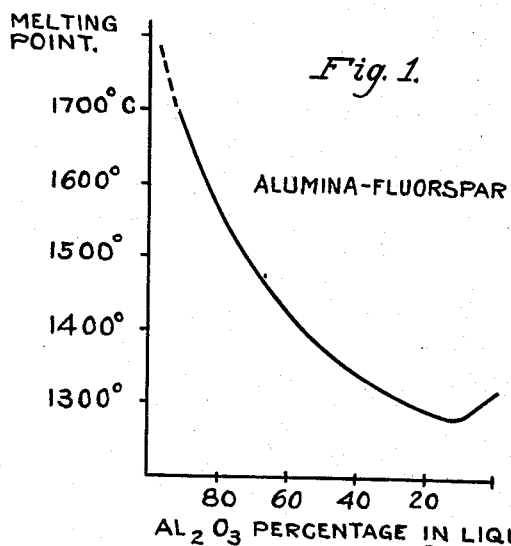
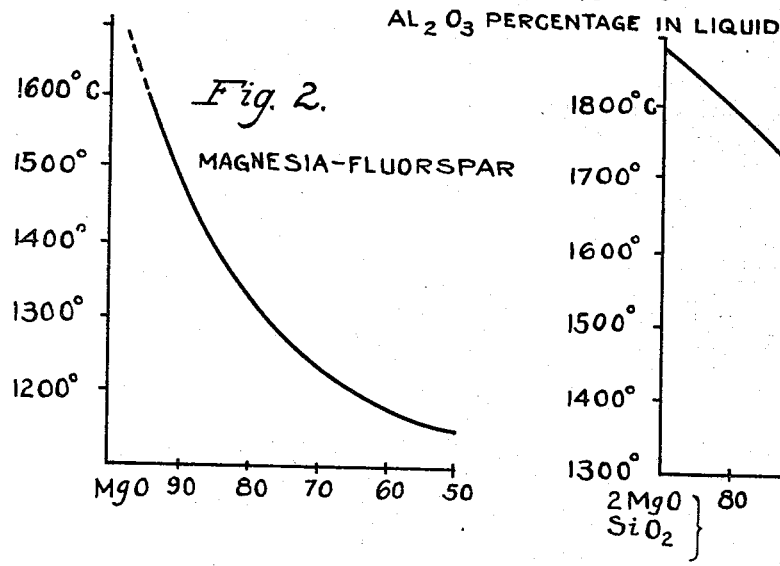
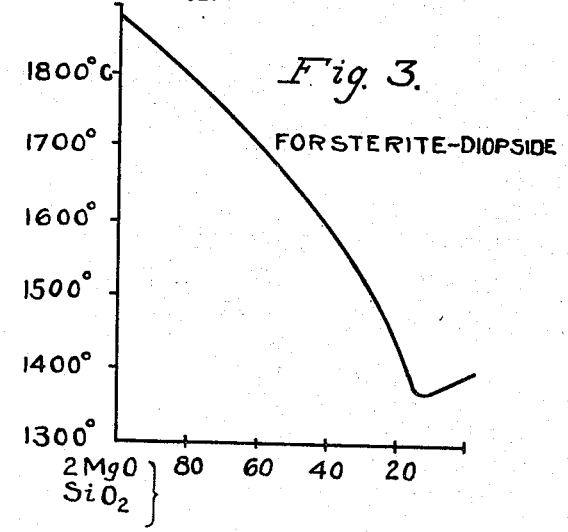
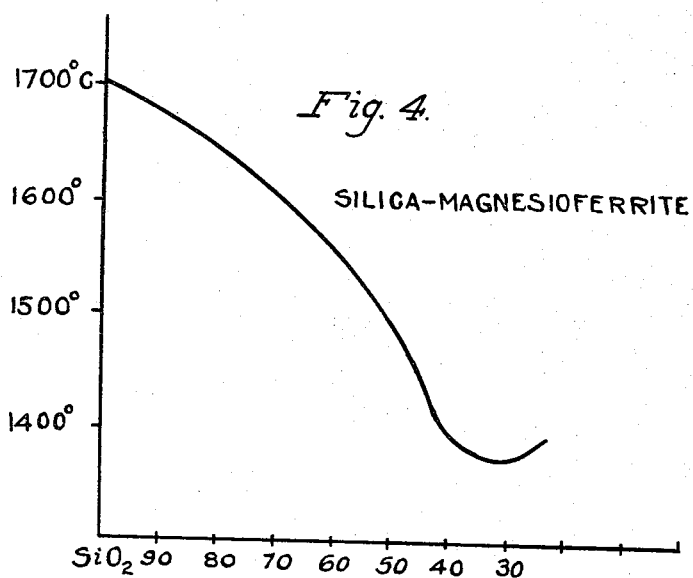

2,004,595

UNITED STATES PATENT OFFICE 2,004,595

PROCESS OF MAKING SILICON CARBIDE ARTICLES AND RAW BATCH THEREFOR

Raymond C. Benner and Henry N. Baumann, Jr., Niagara Falls, N. Y., assignors to The Carborundum Company, Niagara Falls, N. Y., a corporation of Pennsylvania Application August 26, 1932, Serial No. 630,494 In Great Britain November 20, 1928

4 Claims. (Cl. 25—156)

This invention relates to ceramic articles and compositions, and to a bond therefor, and particularly to a ceramic article or composition which may be vitrified at comparatively low temperatures but which continues to mature without damage when fired to a substantially higher temperature. The present application constitutes a continuation in part of our earlier applications Serial No. 268,364 filed April 7, 1928, and Serial No. 349,739 filed March 25, 1929.

Our invention is particularly applicable to a refractory in whcih the chief ingredient is silicon carbide but may be applied with but slight modification to other refractory products which are relatively inert, such for instance as electrically fused alumina, fused mullite, zircon, etc.

It has long been almost axiomatic in the refractories industry that a refractory should be burned at a temperature higher than that at which it is to be used. We have found, however, that by use of our invention it is possible to produce refractories by burning them at a relatively low temperature, which refractories may be used subsequently at temperatures 300° C. or more above the said burning temperature without weakening or other adverse effect. Our refractories are, moreover, exceptionally free from the spalling which has so often characterized refractories of the type hitherto produced, particularly when made from fused oxides such as alumina. We are thus able not only to produce a superior refractory by our method but to do so at a cost less than that of producing refractories which have to be burned at materially higher temperatures.

For the production of refractories in accordance with our invention, we utilize as bonds that class of mixtures of fluxing and refractory materials, which mixtures are characterized by initial softening of a portion only thereof at a temperature between 1150° C. and 1400° C., and in which the remaining more refractory portion dissolves progressively in the softened portion as the temperature is raised above the initial softening point, thereby continually and uninterruptedly raising the melting point of the softened portion of the mixture as the temperature to which the refractory is subjected is raised and as solution progresses over the desired range.

A mixture of the class which we use is characterized by the presence in it (as the temperature is raised to and just beyond the softening point of the most fusible constituent present at any given time) of a small amount of material sufficiently soft to exert a bonding action on the inert particles with which it comes in contact but not sufficiently fluid to permit slippage of such particles with resultant slumping or collapse of the refractory. In order that this condition may exist we find it necessary that the increase of softening point as the proportion of refractory bond constituent in solution is increased, shall not be either too rapid or too slow. In the first case (too rapid rise) the softened portion of the bond is immediately absorbed by the refractory component and its bonding power is largely lost. This is particularly true when solution is accompanied by a pronounced chemical reaction between the two components of the bond. In the other case (too slow rise) either the amount of fluid component becomes excessive or the total temperature range over which the refractory is serviceable is greatly reduced. We find that best results are secured when the melting point of the fused portion is increased by from 5° to 25° C. (approximately) for each percent increase of refractory component therein. It is not necessary that this increment be a constant over the entire working range but only that it be always an increment rather than a decrement, and it is desirable that it fall within the given range of 5–25° C. per percent at all times.

It will be noted that in this specification we refer sometimes to freezing and sometimes to softening or melting point. Our meaning in the various cases is the same, the distinction being made merely to aid in explaining the phenomena under discussion in conjunction with the immediate context. The temperature in either case is that at which a liquid having a given composition is in equilibrium with the solid refractory constituent of the bond. Changes in crystal structure, etc. are not considered in this connection.

Several examples of bonds of the type contemplated by our invention are given below. The use of this class of bonds permits the ready burning off of carbonaceous material, including the temporary binders such as dextrin, cellulose sulfite pitch, etc., which are commonly used in the production of refractories from relatively inert non-plastic materials of the type in question. In order for the removal of carbonaceous matter to be successfully accomplished the refractory should remain open and permeable to oxidizing gases and it is necessary therefore that no softening of the bond take place at a temperature low enough to prevent complete oxidation of the carbonaceous material; that it is to say, at temperatures below 900 to 1000° C., as the softening of the bond serves to seal the refractory against permeation by oxidizing gases. In order to reduce the expense of burning however, it is desirable that the bond start to mature at a temperature as little above this range as is practical. This is also desirable in silicon carbide refractories because of the fact that silicon carbide may be oxidized rapidly at temperatures above 1000° C. and the softening of the bond coats the silicon carbide thus excluding oxidizing gases. Due to the presence of various impurities, such as iron oxide, in ordinary commercial grains, the fusion point of the added bonding materials is usually reduced a considerable amount below the fusion point of the bond in the absence of such impurities. Hence we find that it is desirable (leaving such impurities out of consideration) that our bonds have an initial softening point of not less than 1150° C., and in order that excessive burning temperatures may not be required we prefer to select those bonds having an initial softening point not greater than 1400° C. It is moreover desirable that the melting point of the combined bond ingredients increase continuously in the manner noted over a range of at least 300° C. above the initial softening point in order that the refractory may have a wide range of possible application.

Certain bonds which are continuously maturing also are resistant to reducing conditions in an unusual degree. Such bonds are substantially silica free and include those containing a considerable proportion of an alkaline earth halide such as calcium fluoride. This class of bonds is claimed in our copending application Serial No. 589,527 filed January 28, 1932 as a continuation of our application Serial No. 269,075 filed April 11, 1928.

We have found that there are numerous mixtures falling within the class of bonds contemplated by our invention from which we have selected those below for purpose of illustration. The melting or freezing points of these representative mixes or systems are shown in the accompanying figures in which:

Figure 1 represents the variation of softening point vs. percentage composition of alumina (in the liquid) in a system composed of alumina and fluorspar;

Figure 2 shows similar values for the system comprising magnesia and fluorspar;

Figure 3 is a similar curve for a system wherein both components are silicates; namely, forsterite ($Mg_2SiO_4$) and diopside ($CaMg(SiO_3)_2$);

Figure 4 is a similar curve for a binary system of silica and magnesio-ferrite.

With reference to Figure 1, it will be seen that the curve showing melting point vs. composition in the alumina-fluorspar system ascends continuously with increasing alumina from the eutectic temperature at 1280° C. over a range of several hundred degrees to the fusion point of alumina at 2050° C., an average of 8.5° C. per percent. The eutectic composition itself is very close to the calcium fluoride line, and melts only 50° below the melting point of calcium fluoride. It is thus apparent that the desired condition of increasing fusion point with increasing percentage of alumina prevails over a wide range from a composition containing only approximate 10% to a composition containing 100% alumina.

In Figure 2 there is illustrated the binary system of magnesia (MgO) and fluorspar ($CaF_2$). By examination of Figure 2 it will be seen that between the composition limits of 50% to 100% magnesia, the system has characteristics similar to those possessed by the alumina calcium fluoride system, ascending from 1150° C. to the fusion point of magnesia (1940° C.), an average rise of 16° C. per percent.

Simple binary systems containing silica as one of their components cannot generally be adapted to this principle on account of the irregularity of their melting point curves. We have found, however, that our invention is applicable to more complex systems such as those in which the components themselves are silicates. An example of such a combination is the system Diopside-Forsterite $$(CaMg(SiO_3)_2 - Mg_2SiO_4)$$

shown in Figure 3. The fusion point in this system between the range 15% and 100% Forsterite rises gradually but continuously from 1375° C. to 1890° C. (7° per percent). In practice we may use either the natural or synthetic mixtures having the same compositions.

Figure 4 relating to a part of the system silica-magnesioferrite shows a continuously rising melting point from that of the eutectic up to the fusion point of silica (4.9° per percent). This system furnishes a very valuable bond for silicon carbide refractories in which part of the silica, which causes the rise in fusion point of the bond, results from oxidation of the surface of the silicon carbide grain below the eutectic fusion temperature of the system. After the melting point of the eutectic composition is reached, this silica is dissolved continuously in the magnesioferrite-silica melt as the temperature is increased. This bond is in contact with and envelopes the silicon carbide grains to an unusual degree, thus retarding further oxidation of the silicon carbide.

In a system where the softening point of the most fusible component is below approximately 1150° C., it is possible to first calcine the ingredients at 1150° C. to complete such solution as occurs up to this point, then pulverize the resulting fused product and thereafter use it in a bond. A system comprising silica and sodium silicate presents such a condition, although such a system is not especially desirable for most operations because the melting point increases too rapidly for each percent of increase in the silica that goes into solution.

As an example of the application of our invention, we cite the following illustrative case. A raw batch is prepared comprising 90 parts by weight of 14 and finer silicon carbide and 10 parts by weight of a mixture of equal parts of calcium fluoride and calcined alumina. To this is added two parts by weight of cellulose sulphite pitch, and the various ingredients are thoroughly dry mixed after which sufficient water is added to temper the mix suitably for fabrication. Articles of the desired shape and size are pressed or tamped from this mix and then dried in the usual way and fired in a kiln at a temperature of from 1300° C. to 1400° C.

Refractories of this composition have proved very satisfactory in service. We have found that on account of the peculiar properties of bonds of our type, it is possible to vary the proportion of bond and grain considerably. For example, the mix may vary at least from 5 to 15% of bond, and the resulting refractories do not vary much in character.

As an example of a magnesioferrite bonded silicon carbide refractory, we use a dry mix of the following composition:

| | Parts |
|---|---|
| Silicon carbide (14 mesh and finer refractory grain) | 90 |
| An intimate mixture of calcined magnesite and commercial hematite in their molecular ratio. (All finely pulverized) | 10 |

This composition is mixed with a temporary organic binder such as dextrin, moistened and either pressed or tamped into the desired refractory shapes. Commercial hematite contains silica only as an appreciable impurity, and this silica initiates the continuously maturing process, the rest of the silica coming from the oxidation of the surface of the silicon carbide grains with which the bond is thoroughly mixed. The refractory, after drying, is burned to at least 1400° C. and preferably higher. Silicon carbide refractories made from this composition were found to have a thermal conductivity of .043 cal/cm$^3$/sec/°C., a value approximately 10% higher than that for any other bonded silicon carbide refractory with which we are familiar.

In modifying the first above mixture for use with fused alumina, we may either simply substitute fused alumina for the silicon carbide or we may use a mix of the following type—

| | Parts |
|---|---|
| Fused alumina 14 and finer | 85 |
| Calcined alumina 100 and finer | 10 |
| A mixture of equal parts of calcium fluoride and calcined alumina | 5 |
| Temporary binder | 2 |

The calcined alumina is less inert chemically than fused alumina in the same grit sizes, and its use results in a more rapid and more thorough bonding action than when fused alumina alone is used.

We believe that the excellent resistance which our materials show in respect to spalling is due to the fact that they at no time contain a large amount of glassy material, such as is present in refractories which are burned to a temperature which softens the entire bond leaving large amounts of highly vitrified material in the ware. In our refractories no highly vitrified material is present. In cases where the bond comprises alumina and a flux the alumina crystallizes out of the molten bond readily as the refractory is cooled, leaving a refractory bonded with alumina crystals and the more fusible eutectic. In cases where the bond is a silicate, crystallization is slower and a small proportion of semi-vitreous bond is left as the refractory cools. This semi-vitreous constituent is small in amount and has a fusion point approximately equal to the highest temperature to which the brick has been fired. It is present in an amount just sufficient to effect proper bonding without imparting the glassy structure which is so subject to damage by spalling. It has been found that upon 30 quenchings according to the A. S. T. M. (American Society for Testing Materials) standard spalling tests as described on page 209 of their "Tentative Standards—1924", a fused alumina brick made from the mix mentioned above will lose on the average less than 20% of its original dry weight in thirty quenchings, whereas the fused alumina refractories on the market prior to this invention showed only about one-fifth of this resistance to spalling.

Upon use at any temperature below the original burning temperature our refractories are entirely unaltered by heat. If used at temperatures higher than the burning temperature, the bond continues to mature in the same manner as described above without damage to the refractory.

Ceramic brick or shapes of our manufacture show practically no volume change whether fired at 1300 or 1500° C. The porosity when fired at 1300° will differ by less than 1% from its porosity when fired at 1500° C.

While for the sake of simplicity we have illustrated the bonds in the foregoing illustrations as binary compounds, our invention also contemplates the use of bonds having a larger number of components than two, always provided however that one of the bond components of a highly refractory nature is present in excess of the remainder of the mixture. This refractory component must moreover be soluble in the remainder of the mixture in increasing amounts as the temperature increases over the specified range in the manner explained above. The magnesioferrite silica system is in reality an illustration of the use of such a multi-component bond, the ratio of magnesia to iron oxide being variable over a considerable range so long as the silica is present in sufficient excess to yield the desired increasing melting point curve. The diopside-forsterite system is also an illustration of the presence of more than two components (i. e. lime, magnesia and silica) under special conditions.

In addition to use in preburned shaped refractories, our invention is also applicable to refractory cements such as those which are rammed in and burned in place or those used as mortar for laying up refractory furnace linings, etc. In fact the value of our invention is particularly great in such applications because our cement can be satisfactorily vitrified in place at a relatively lower temperature than is required for many mixtures of comparable refractoriness, and yet is not harmed even by burning at excessive temperatures for considerable periods.

Having thus described our invention, in a full, clear and concise manner, what we claim is—

1. In the process of making silicon carbide refractory articles, the steps which comprise admixing with silicon carbide grain a carbonaceous temporary binder and a vitrifiable binder of that class of mixtures of fluxing and refractory materials, each of which mixtures is characterized when present in such an admixture by initial softening of a portion only thereof at but not substantially below a temperature approximating that at which rapid oxidation of silicon carbide begins, in which softened portion the more refractory portion dissolves in increasing amounts progressively over a range of at least 400° C. as the temperature is raised above the initial softening point, forming the mixture, heating the formed mixture for a time sufficient to burn out the temporary binder at a temperature below that at which rapid oxidation of silicon carbide begins, and thereafter raising the temperature to a point sufficient to cause the bond to flow enough to protect the silicon carbide from oxidation which would otherwise take place.

2. In the process of making silicon carbide refractories, the steps which comprise admixing with silicon carbide grain and a carbonaceous material, a material which will form a vitrifiable ceramic binder which has an initial maturing point at a temperature above that at which the carbonaceous material may be oxidized and substantially below temperature approximating that at which the rapid oxidation of silicon carbide begins and which continues to mature over a range of a least 400° C. as the temperature is raised above its initial maturing point, forming the mixture, heating the formed mixture so as to burn out the carbonaceous material at a temperature below the initial maturing point of the binder, and thereafter heating the formed mixture to a temperature above that at which rapid oxidation of silicon carbide begins, the silicon carbide being protected against oxidation at such higher temperatures by the continuously maturing binder.

3. A raw batch for the manufacture of silicon carbide refractories, said batch comprising silicon carbide grains, a carbonaceous temporary binder and a permanent binder which comprises a fluxing component which softens above the temperature required to burn out the carbonaceous binder and below the temperature at which rapid oxidation of silicon carbide begins, and a refractory component soluble in said fluxing component in continuously and gradually increasing amounts as the temperature is increased above that point for at least 400° C.

4. In the manufacture of silicon carbide refractory articles the steps which comprise preparing a bond by mixing together a fluxing material and a more refractory material soluble therein in increasing amounts with increasing temperature, wherein the most fusible constituent present in the mixture melts below 1150° C., calcining the mixture to a temperature approximately 1150° C. and thereafter pulverizing the bond and admixing it with silicon carbide grain, and a carbonaceous binder, forming an article from said mix, burning the article to remove the carbonaceous material at a temperature below that at which the bond begins to soften and after removal of the carbonaceous material burning the article at a higher temperature sufficient to cause the bond to develop thus preventing rapid oxidation of the silicon carbide.

RAYMOND C. BENNER.
HENRY N. BAUMANN, Jr.